US006902158B2

(12) United States Patent
Yonezawa et al.

(10) Patent No.: US 6,902,158 B2
(45) Date of Patent: Jun. 7, 2005

(54) ROTARY CLAMP

(75) Inventors: Keitaro Yonezawa, Kobe (JP); Hideaki Yokota, Kobe (JP); Yosuke Haruna, Kobe (JP)

(73) Assignee: Kabushiki Kaisha KOSMEK, Hyogo (JP)

( * ) Notice: Subject to any disclaimer, the term of this patent is extended or adjusted under 35 U.S.C. 154(b) by 119 days.

(21) Appl. No.: 10/279,283

(22) Filed: Oct. 24, 2002

(65) Prior Publication Data

US 2003/0090046 A1 May 15, 2003

(30) Foreign Application Priority Data

Nov. 13, 2001 (JP) .................................... P 2001-346977
Dec. 18, 2001 (JP) .................................... P 2001-383987
Apr. 3, 2002 (JP) .................................... P 2002-100851

(51) Int. Cl.[7] .................................................. B23Q 3/08
(52) U.S. Cl. ............................................ 269/24; 269/32
(58) Field of Search .............................. 269/24, 32, 20, 269/25, 91–94; 92/33

(56) References Cited

U.S. PATENT DOCUMENTS 3,572,216 A 3/1971 Seesody
4,620,695 A 11/1986 Vanistendael
5,192,058 A 3/1993 VanDalsem et al.
5,820,118 A 10/1998 Craft
5,927,700 A 7/1999 Yonezawa
5,954,319 A 9/1999 Yonezawa
6,113,086 A 9/2000 Yonezawa

FOREIGN PATENT DOCUMENTS

EP 0 802 330 A1 10/1997
EP 0 819 501 A1 1/1998

*Primary Examiner*—Robert C. Watson
(74) *Attorney, Agent, or Firm*—Akin Gump Strauss Hauer & Feld, L.L.P.

(57) ABSTRACT

A housing (3) has an upper end wall (3*a*) which supports an upper slide portion (11) of a clamp rod (5) vertically movably. The housing (3) has a lower end wall (3*b*), a support cylinder (13) of which supports a lower slide portion (12) of the rod (5) vertically movably. The rod (5) is provided with an input portion (14) between the upper slide portion (11) and the lower slide portion (12). A clamp spring (20) connected to the input portion (14) drives the rod (5) downwards for clamping. The lower slide portion (12) has an outer periphery provided with a helical rotary groove (27) and a straight groove (28) which is in upward continuity with the rotary groove (27). A ball (29) engages with the rotary groove (27) and the straight groove (28). The ball (29) is supported by an inner wall (13*a*) of the support cylinder (13).

14 Claims, 10 Drawing Sheets

ROTARY CLAMP

BACKGROUND OF THE INVENTION

1. Field of the Invention

The present invention relates to a clamp of the type that rotates a clamp rod.

2. Explanation of Related Art

There is a conventional technique of the rotary clamp of this type which is constructed in the following manner, as disclosed in U.S. Pat. No. 5,820,118.

A clamp rod is inserted into a housing, an upper wall of which supports a halfway height portion of the clamp rod vertically movably. The clamp rod has a lower portion provided with a piston which is supported by a barrel portion of the housing vertically movably.

The conventional technique has the following problem.

A fitting gap between an outer peripheral surface of the piston provided at the lower portion of the clamp rod and the barrel portion of the housing. Therefore, when driving the clamp rod for clamping, the fitting gap inclines the clamp rod although only slightly to result in the impossibility of guiding the clamp rod with a good accuracy.

SUMMARY OF THE INVENTION

The present invention has an object making it possible to guide the clamp rod with a high accuracy.

In order to accomplish the above object, the present invention has constructed a rotary clamp in the following manner.

For example, as shown in FIGS. 1 to 4 or in FIGS. 7 to 10, alternatively in each of FIGS. 11, 12 and 13, a housing 3 has a first end wall 3*a* which supports a first slide portion 11 of a clamp rod 5 axially movably and has a second end wall 3*b* which supports a second slide portion 12 of the clamp rod 5 axially movably. The clamp rod 5 is provided with an input portion 14 between the first slide portion 11 and the second slide portion 12. The input portion 14 drives the clamp rod 5 for clamping toward the second end wall 3*b*. The second slide portion 12 has an outer periphery provided with a rotary portion 27 and a straight portion 28 which are in continuity with each other from the second end wall 3*b* to the first end wall 3*a*. The second end wall 3*b* is provided with an engaging member 29 which engages with the rotary portion 27 and the straight portion 28.

The present invention offers the following advantages.

The clamp rod is provided with two slide portions of the first slide portion and the second slide portion outside the opposite ends of the input portion. Therefore, these two slide portions axially spaced apart from each other can strongly support the clamp rod and therefore prevent the inclination of the clamp rod. In consequence, the housing can surely guide the clamp rod with a high accuracy.

A rotary mechanism which comprises the rotary portion and the engaging member is provided between the second end wall which has the above-mentioned guiding strength, and the second slide portion. Therefore, it can fully endure a rotary torque and increase its service lifetime. In addition, the engaging member is provided in the second end wall, thereby enabling a portion for installing the engaging member to serve as a portion for supporting the second slide portion. Thus it is possible to reduce a height of the housing and make the rotary clamp compact.

The present invention includes the following rotary clamp.

The second slide portion 12 has an outer diameter set to a value smaller than that of an outer diameter of the first slide portion 11. This invention offers the following advantage.

To reduce the outer diameter of the second slide portion results in shortening a lead of the rotary portion such as a rotary groove formed in the second slide portion. This decreases the rotation stroke of the clamp rod. Therefore, the rotary clamp can be made compact. Besides, in the case where the input portion is driven by a piston, pressurized fluid is supplied to the piston in a reduced amount.

Moreover, the present invention includes the following rotary clamp.

For example, as shown in FIG. 1, an annular piston 15 is externally fitted onto the clamp rod 5 axially movably and hermetically. The piston 15 faces the input portion 14 from a side of the first end wall 3*a*. There is provided between the piston 15 and the first end wall 3*a*, a first chamber 21 in which a clamp spring 20 is attached. And there is provided between the piston 15 and the second end wall 3*b*, a second chamber 22 to which pressurized fluid for unclamping is supplied. This invention offers the following advantage.

When unclamping, a force which has acted from the pressurized fluid in the second chamber to the piston does not apply to the clamp rod. This prevents an excessive force from acting on the rotary portion and the engaging member to result in increasing the service lifetime of the rotary mechanism which comprises the rotary portion and the engaging member.

Further, the present invention includes the following rotary clamp.

For example, as shown in FIG. 7 or FIG. 11, an annular piston 15 is externally fitted onto the clamp rod 5 axially movably and hermetically. The piston 15 faces the input portion 14 from a side of the first end wall 3*a*. There is provided between the piston 15 and the first end wall 3*a*, a first chamber 21 to which pressurized fluid for clamping is supplied. And there is also provided between the piston 15 and the second end wall 3*b*, a second chamber 22 to which pressurized fluid for unclamping is supplied. This invention offers the following advantage as well as the above-mentioned invention.

When unclamping, a force which has acted from the pressurized fluid in the second chamber to the piston does not apply to the clamp rod. This prevents an excessive force from acting on the rotary portion and the engaging member to result in increasing the service lifetime of the rotary mechanism which comprises the rotary portion and the engaging member.

Moreover, the present invention includes the following rotary clamp.

For instance, as shown in FIG. 1, a radial bearing 24 is arranged between the piston 15 and the input portion 14. In this case, the clamp rod 5 smoothly rotates.

In addition, the present invention includes the following rotary clamp.

For example, as shown in FIGS. 1 to 4, each of the rotary portion 27 and the straight portion 28 is defined by a groove and the engaging member 29 is formed from a ball. In this case, the clamp rod can more smoothly rotate and the rotary mechanism can increase its service lifetime.

Besides, the present invention includes the following rotary clamp.

For instance, as shown in FIGS. 1 to 4 or in FIGS. 7 to 10, the clamp rod 5 is peripherally provided with the rotary portion 27 and the straight portion 28, each of which is defined by the groove, in plural number. The engaging balls 29 which engage with the rotary portions 27 and the straight portions 28 are rotatably supported by through holes 31 provided in the housing 3, respectively, and a sleeve 35 is rotatably and externally fitted over the engaging balls 29. This invention offers the following advantage.

When the clamp rod rotates, almost only rolling friction acts between an inner peripheral surface of the sleeve and the engaging balls, but sliding friction hardly acts therebetween. This reduces a resistance which acts from the sleeve to the engaging balls to result in decreasing a frictional force which acts from the engaging balls to the rotary grooves and therefore smoothly rotating the clamp rod with a light force.

BRIEF DESCRIPTION OF THE DRAWINGS

FIG. 1 is a partial sectional view of a rotary clamp when seen in elevation;

FIG. 2 is a sectional view of a rotary mechanism provided in the clamp when seen in plan;

FIG. 3 is an enlarged view of an essential portion in FIG. 1 and corresponds to a sectional view when seen along a line III—III in FIG. 2 in a direction indicated by arrows;

FIG. 4 is an enlarged and developed view of a lower slide portion provided in a clamp rod of the clamp;

FIG. 7 is a partial sectional view of the clamp when seen in elevation and is similar to FIG. 1;

FIG. 8 is a sectional view of a rotary mechanism provided in the clamp when seen in plan and is similar to FIG. 2;

FIG. 9 is an enlarged view of an essential portion in FIG. 7 and corresponds to a sectional view when seen along a line 1X—1X in FIG. 8 in a direction indicated by arrows;

FIG. 10 is an enlarged and developed view of a lower slide portion provided in a clamp rod of the clamp and is similar to FIG. 4;

DESCRIPTION OF THE PREFERRED EMBODIMENTS

Figure 1:
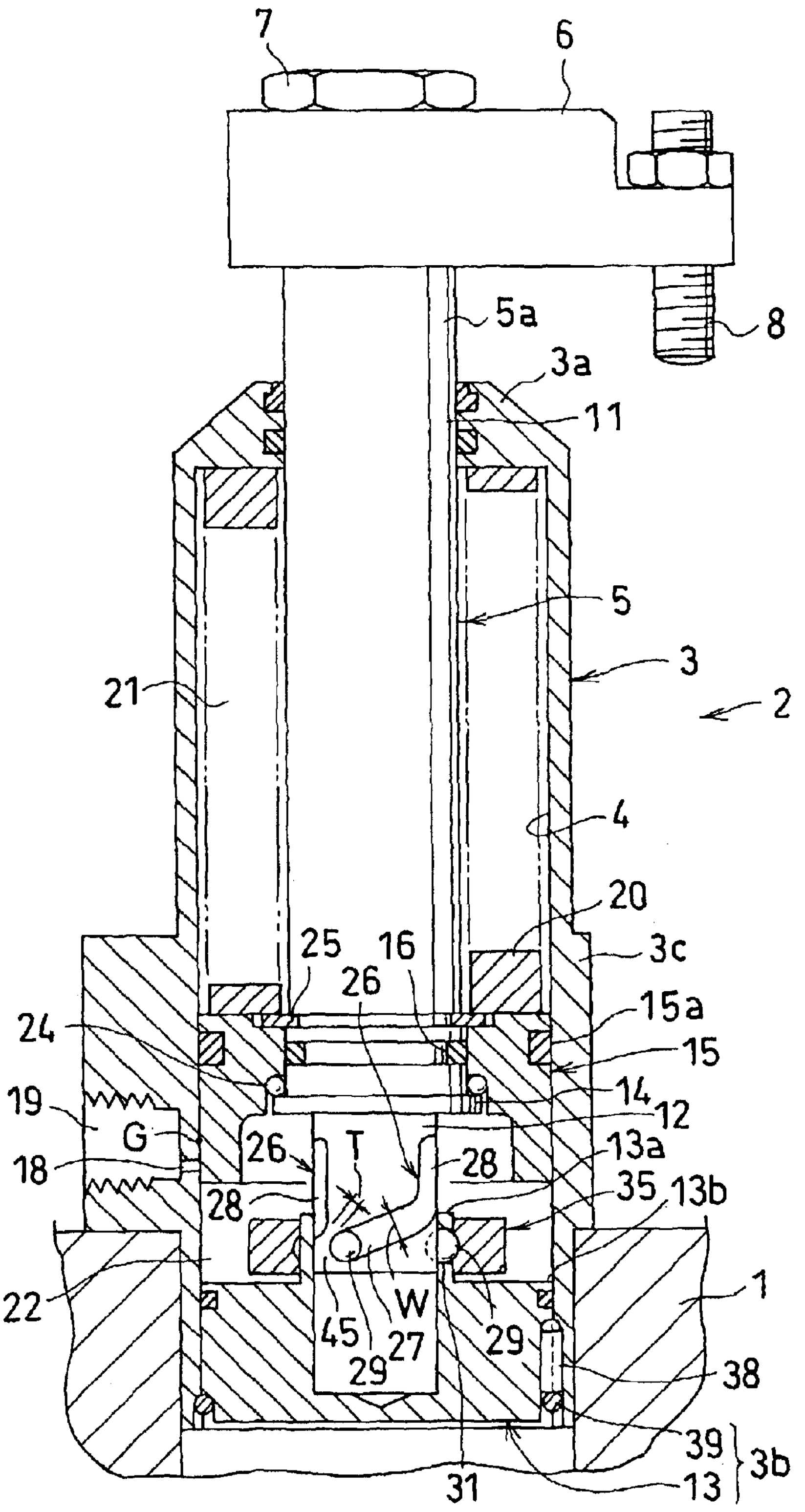
FIGS. 1 to 4 show a first embodiment of the present invention.

A first embodiment of the present invention is explained with reference to FIGS. 1 to 4. Fist, an explanation is given for a whole structure of a rotary clamp by resorting to FIG. 1. FIG. 1 is a partial sectional view of the clamp when seen in elevation.

A housing 3 of a clamp 2 is fixed to a work pallet 1 through a plurality of bolts (not shown). The housing 3 has a cylindrical hole 4 into which a clamp rod 5 is inserted. The clamp rod 5 has an upper end portion to which an arm 6 is secured at a desired rotation position by a nut 7. The arm 6 has a leading end portion to which a push bolt 8 is fixed.

The housing 3 has an upper end wall (first end wall) 3*a* which supports an upper slide portion (first slide portion) 11 provided in a rod main body 5*a* of the clamp rod 5 slidably and hermetically. Further, a support cylinder 13 forms part of a lower end wall (second end wall) 3*b* of the housing 3 and slidably supports a lower slide portion (second slide portion) 12 which projects downwards of the rod main body 5*a*. The upper slide portion 11 and the lower slide portion 12 are tightly fitted into the upper end wall 3*a* and the lower end wall 3*b*, respectively.

The lower slide portion 12 has an outer diameter set to a value smaller than that of an outer diameter of the upper slide portion 11.

A means for driving the clamp rod 5 is constructed as follows.

The clamp rod 5 is provided with an input portion 14 in the shape of a flange between the upper slide portion 11 and the lower slide portion 12. Further, an annular piston 15 is externally fitted onto the clamp rod 5 vertically movably and hermetically through a sealing member 16. The piston 15 faces the input portion 14 from above. And the piston 15 is inserted into the cylindrical hole 4 hermetically through another sealing member 15*a*.

In addition, a radial bearing 24 is arranged between the input portion 14 and the piston 15. A snap ring 25 prevents the removal of the piston 15. Here the radial bearing 24 is composed of many metal balls and can receive not only a radial force but also a vertical thrust.

A first chamber 21 for clamping is provided between the piston 15 and the upper end wall 3*a*. A clamp spring 20 made of a compressed coil spring is attached in the first chamber 21. A second chamber 22 for unclamping is provided between the piston 15 and the lower end wall 3*b*. Pressurized oil is supplied to and discharged from the second chamber 22 through a pressurized oil supply and discharge port 19 for unclamping and a restricting oil passage 18.

A fitting gap (G) between a peripheral wall of the second chamber 22 and an outer peripheral surface of the piston 15 limits supply amount of pressurized oil from the oil passage 18 to the second chamber 22 as well as discharge amount of the pressurized oil from the second chamber 22 to the oil passage 18.

A rotary mechanism is provided over the lower slide portion 12 of the clamp rod 5 and an upper portion of an inner wall 13*a* of the support cylinder 13. The rotary mechanism is constructed in the following manner as shown in FIG. 1 and FIG. 2 to FIG. 4.

Figure 2:
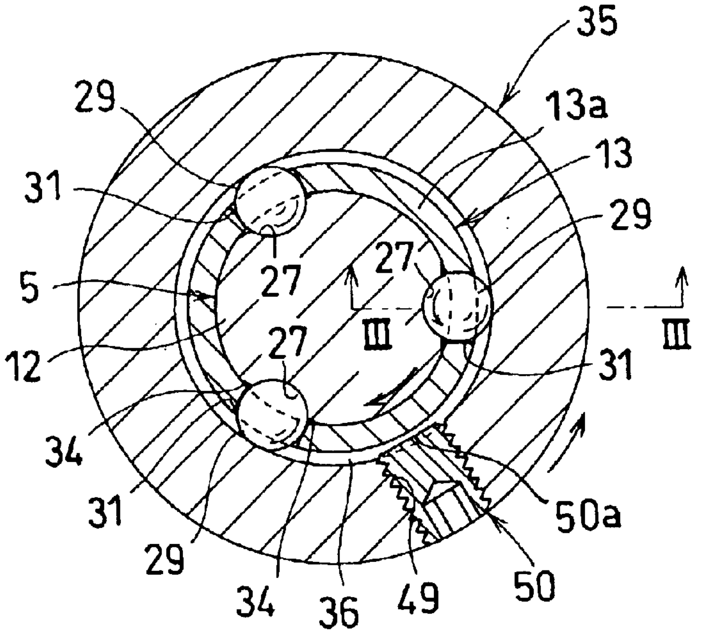
Figure 3:
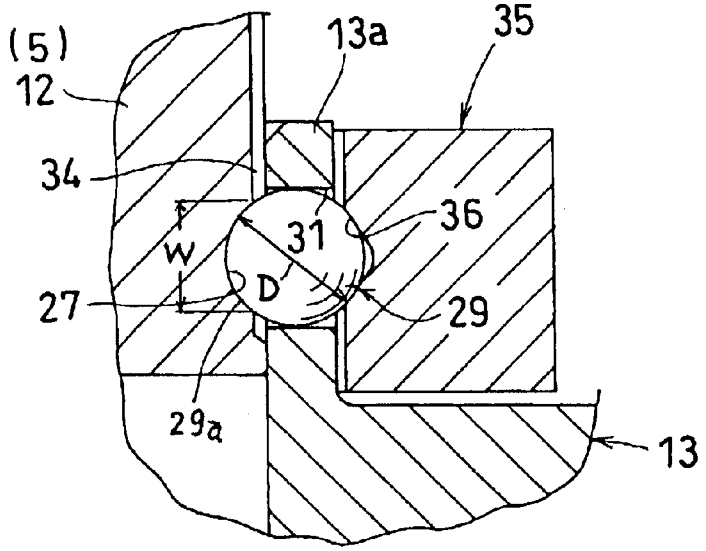
Figure 4:
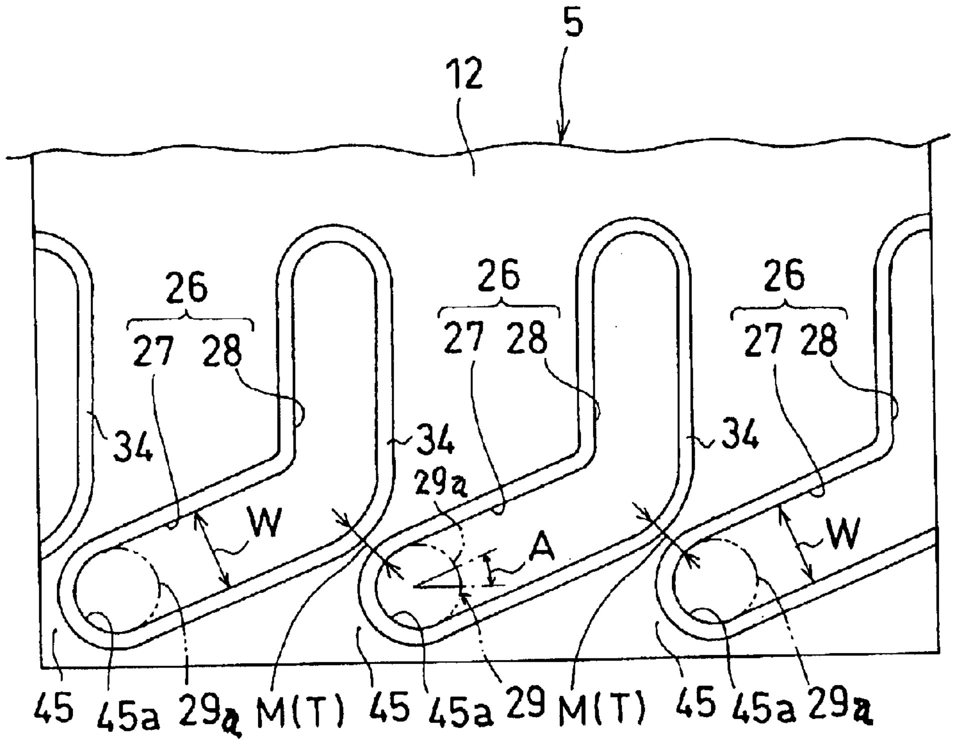

FIG. 2 is a sectional view of the rotary mechanism when seen in plan. FIG. 3 is an enlarged view of an essential portion in FIG. 1 and corresponds to a sectional view when seen along a line III-III in FIG. 2 in a direction indicated by arrows. FIG. 4 is an enlarged and developed view of an outer peripheral surface of the lower slide portion 12.

The lower slide portion 12 has the outer peripheral surface provided with three guide grooves 26 peripherally at substantially the same spacing. Each of the guide grooves 26 is formed from a groove in the shape of an arc or a segment when seen in section. And it comprises a helical rotary groove 27 and a straight groove 28 which is in upward continuity with the helical rotary groove 27. The rotary grooves 27 as well as the straight grooves 28 are arranged in parallel with one another. As for the adjacent guide grooves 26, 26, a partition wall is minimum in thickness between a lower portion of a right rotary groove 27 and an upper portion of a left rotary groove 27 in FIG. 4. The minimum thickness (M) of the partition wall is set to a value smaller than a groove width (W) of the guide groove 26. Further, the rotary groove 27 is inclined at an angle (A) which is set to a small value within a range of about 11 degrees to about 25 degrees. In the exemplified clamp which relies on a spring force, the inclination angle (A) is preferably set to a value within a range of about 11 degrees to about 20 degrees for reducing the rotation stroke.

As such the inclination angle (A) of the helical rotary groove 27 has been made small to result in largely shortening a lead of the rotary groove 27. This decreases the stroke for rotating the clamp rod 5.

An engaging ball 29 is fitted into each of the guide grooves 26. Numeral 29*a* in FIGS. 3 and 4 designates a fitting portion of the engaging ball 29. The engaging ball 29 has a diameter (D) (see FIG. 3) set to a value larger than the minimum thickness (M) of the partition wall between the adjacent rotary grooves 27, 27. The respective engaging balls 29 are rotatably supported by three through holes 31 provided in the upper portion of the inner wall 13*a* of the support cylinder 13. A sleeve 35 is externally fitted over these three engaging balls 29 rotatably around the axis. Speaking it in more detail, the sleeve 35 has an inner peripheral surface formed with a groove 36 in the shape of a letter 'V'. The V-shaped groove 36 has two vertical points at which the engaging ball 29 can roll.

The engaging ball 29 is inserted into the through hole 31 via an internally threaded hole 49 which is provided in the sleeve 35. A closure bolt 50 is attached to the internally threaded hole 49. A projection 50*a* at a leading end of the closure bolt 50 can receive the engaging ball 29.

The rotary groove 27 has a lower end portion provided with a stopper wall 45 which receives the fitting portion 29*a* of the engaging ball 29. The stopper wall 45 has a receiving surface 45*a* which can fit with the engaging ball 29.

Besides, the guide groove 26 has an opening which is provided at its edge portion with a cutting surface 34 for preventing interference. Owing to this arrangement, even if the opening edge portion of the guide groove 26 undergoes a plastic deformation by a surface pressure of the engaging ball 29 and heaps up, it is possible to prevent the interference between the heaped-up portion and the inner wall 13*a* of the support cylinder 13. As a result, the clamp rod 5 smoothly rotates for a long period of time.

Further, as shown in FIG. 1, an outer wall 13*b* of the support cylinder 13 is attached to a barrel portion 3*c* of the housing 3 through a positioning pin 38 which extends vertically, so as to be prevented from rotating. This makes it possible to accurately determine a rotation phase of the clamp rod 5 with respect to the housing 3. The support cylinder 13 is secured to the housing barrel portion 3*c* by a lock member 39 made of a snap ring.

The rotary clamp 2 operates as follows.

In a state of FIG. 1, pressurized oil is supplied to the second chamber 22 for unclamping, thereby raising the clamp rod 5 to an illustrated rotation and retreat position.

When switching over the clamp 2 to a clamping condition, the pressurized oil in the second chamber 22 is discharged to push down the input portion 14 of the clamp rod 5 by the clamp spring 20. Then the clamp rod 5 goes down along the rotary grooves 27 while rotating in a clockwise direction when seen in plan. Subsequently, it descends straightly along the straight grooves 28. This enables the clamp rod 5 to switch over to a clamping position (not shown).

As shown by an arrow in FIG. 2, when the clamp rod 5 rotates in the clockwise direction when seen in plan, every engaging ball 29 fitted into the rotary groove 27 rolls in a counter-clockwise direction when seen in plan and at the same time the sleeve 35 externally fitted over the respective engaging balls 29 freely rotates in the counter-clockwise direction. This allows almost only rolling friction to act between an inner peripheral surface of the sleeve 35 and every engaging ball 29, but hardly allows sliding friction to act therebetween. This reduces a resistance which acts from the sleeve 35 to every engaging ball 29, which results in decreasing a frictional force which acts from every engaging ball 29 to the rotary groove 27 and therefore smoothly rotating the clamp rod 5 with a light force.

Here, the sleeve 35 has an inner diameter set to a value which is about one and half times a value of an outer diameter of the lower slide portion 12 of the clamp rod 5. Thus in the case of rotating the clamp rod 5 by 90 degrees, the sleeve 35 rotates by about 60 degrees.

When switching over the clamp 2 from the clamping condition to a rotated and retreated condition in FIG. 1, the pressurized oil is supplied to the second chamber 22 for unclamping. Then, first, the piston 15 goes up by an upward oil pressure force which acts on an annular sectional area of the piston 15. Simultaneously, the clamp rod 5 straightly ascends along the straight grooves 28 by an upward oil pressure force which acts on an inner sectional area of the sealing member 16. Subsequently, the clamp rod 5 ascends along the rotary groove 27 while rotating in the counter-clockwise direction when seen in plan, whereby the clamp rod 5 and the arm 6 switch over to the rotation and retreat position in FIG. 1.

In this case, as mentioned above, the upward force which acts from the pressurized oil in the second chamber 22 to the piston 15 does not apply to the clamp rod 5. This prevents an excessive force from acting on the rotary grooves 27 and the engaging balls 29.

At the above time of rotating and retreating, if the clamp rod 5 rotates in the counter-clockwise direction, every engaging ball 29 and the sleeve 35 rotates in a direction opposite to the direction indicated by the arrow in FIG. 2.

Further, at the above time of rotating and retreating, as shown in FIGS. 1 and 4, the stopper wall 45 has the receiving surface 45*a* fitted with the fitting portion 29*a* of the engaging ball 29, thereby inhibiting the rotation of the clamp rod 5. This results in stopping the rotation of the clamp rod 5 with a high accuracy. Moreover, the clamp rod 5 is provided with the stopper wall 45 and therefore offers the following advantage, when compared with a case where the barrel portion 3*c* of the housing 3 is provided with the stopper wall 45.

The cylindrical hole 4 of the housing 3 need not be provided with a stepped portion for the stopper wall and therefore can be formed straight. This can facilitate the machining of the cylindrical hole 4 and besides can make the clamp spring 20 large and strong.

The first embodiment further offers the following advantages.

The clamp rod 5 is provided with the guide grooves 26, into which the engaging balls 29 are fitted, respectively. This enables the support cylinder 13 to support the clamp rod 5 peripherally and substantially evenly through the engaging balls 29. Accordingly, when driven for clamping and for unclamping, the clamp rod 5 can be prevented from inclining. This results in improving the accuracy of placing the push bolt 8 provided in the arm 6 at a clamping position and at an unclamping position.

The partition wall between the adjacent guide grooves 26, 26 has the minimum thickness (T) set to the value smaller than the groove width (W) of the guide groove 26.

Consequently, many guide grooves can be provided in the clamp rod 5 to result in the possibility of peripherally and substantially evenly supporting the clamp rod 5 and at the same time decreasing the inclination angle (A) of the rotary groove 27. This can reduce the stroke required for rotating the clamp rod 5 to thereby make the rotary clamp 2 compact.

The clamp rod 5 is provided with the upper slide portion (first slide portion) 11 and the lower slide portion (second slide portion) 12 outside the opposite ends of the piston 15. Therefore, notwithstanding the existence of a fitting gap of the piston 15, the two slide portions 11, 12 axially spaced apart from each other can prevent the inclination of the clamp rod 5. In consequence, the housing 3 can surely guide the clamp rod 5 with a high accuracy.

The rotary mechanism which comprises the rotary grooves 27 and the engaging balls 29 is provided between the support cylinder 13 which has the above-mentioned guiding strength, and the lower slide portion 12. Therefore, it can fully endure a rotary torque and increase its service lifetime. In addition, the engaging balls 29 are provided in the support cylinder 13, thereby enabling portions for installing the engaging balls 29 to serve as a portion for supporting the lower slide portion 12. Thus it is possible to reduce a height of the housing 3 and make the rotary clamp 2 compact.

Moreover, the lower slide portion 12 has the outer diameter set to the value smaller than that of the outer diameter of the upper slide portion 11 to result in shortening the lead of the rotary groove 27 formed in the lower slide portion 12. This further reduces the stroke for rotating the clamp rod 5 and as a result can make the rotary clamp 2 more compact. Additionally, the pressurized oil for driving the piston 15 is decreased in supply and discharge amount.

Figure 5:
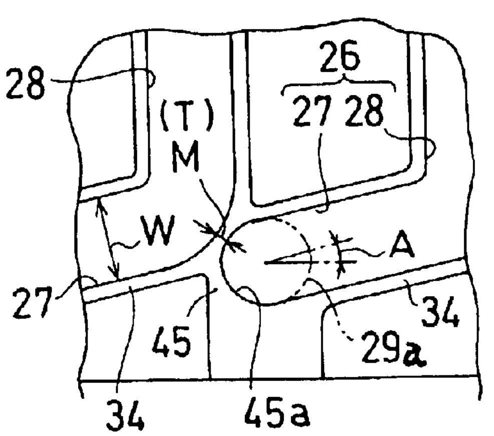
FIG. 5 shows a first modification of the first embodiment and is similar to FIG. 4.

FIG. 5 shows a first modification of the first embodiment and is similar to FIG. 4. In FIG. 5, the partition wall between the adjacent rotary grooves 27, 27 has the minimum thickness (M) set to a value smaller than that shown in FIG. 4. The adjacent cutting surfaces 34, 34 overlap one another at a portion of the minimum thickness (M). Further, in FIG. 5, the inclination angle (A) of the rotary groove 27 is set to a value within a smaller range (about 11 degrees to about 15 degrees) than that of FIG. 4.

Figure 6:
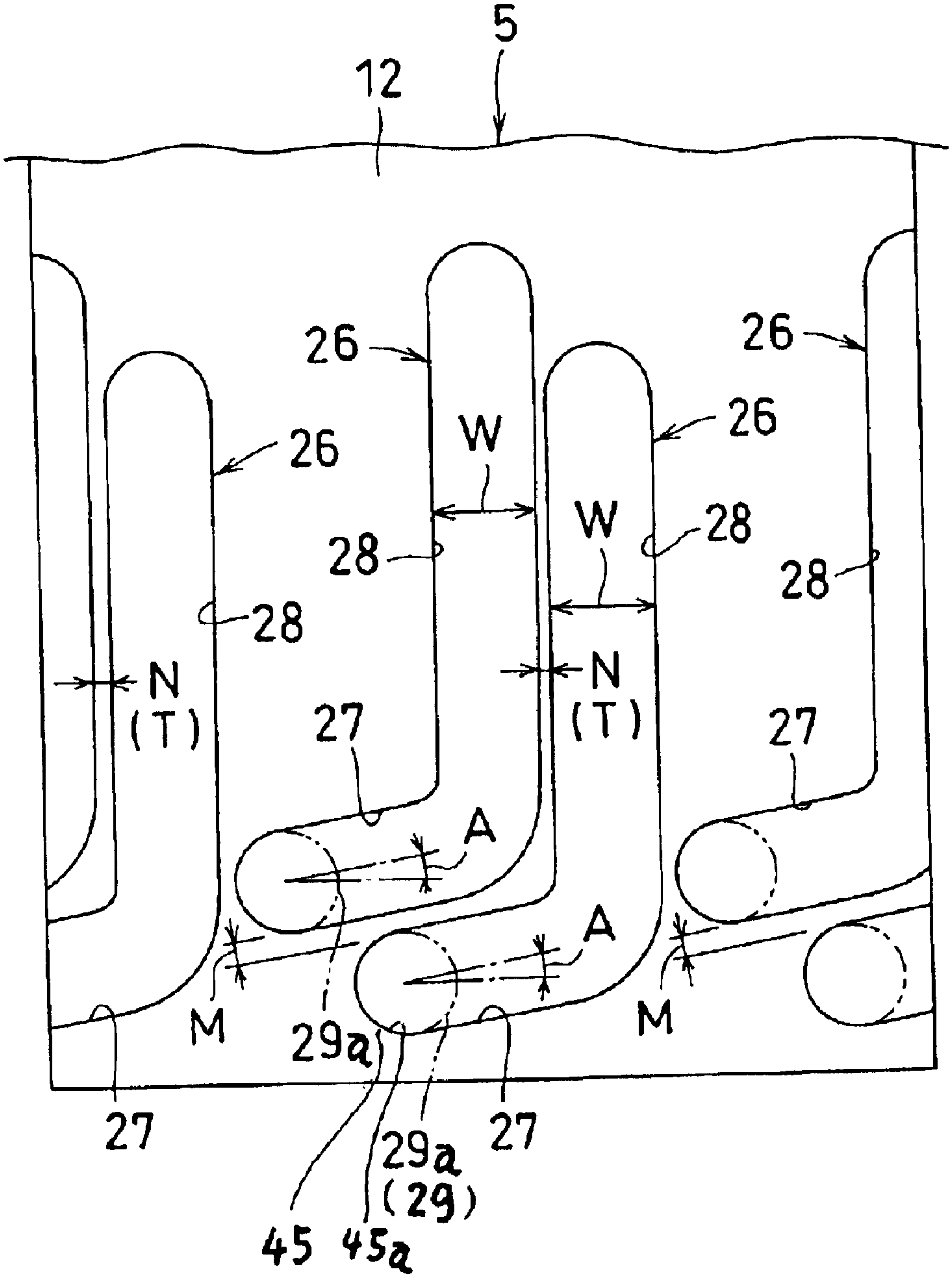
FIG. 6 shows a second modification of the first embodiment and is similar to FIG. 4.

FIG. 6 shows a second modification of the first embodiment and is similar to FIG. 4. In this case, the clamp rod 5 has the lower slide portion 12 provided with four guide grooves 26. A pair of the adjacent guide grooves 26, 26 and the corresponding engaging balls 29 are displaced not only peripherally of the clamp rod 5 but also axially thereof. And the partition wall between a pair of the adjacent rotary grooves 27, 27 has the minimum thickness (M) set to a value smaller than the groove width (W). The partition wall between a pair of the adjacent straight grooves 28, 28 has a minimum thickness (N) set to a value smaller than the groove width (W). Additionally, the latter minimum thickness (N) is set to a value smaller than that of the former minimum thickness (M). Thus the partition wall between the adjacent guide grooves 26, 26 has a minimum thickness (T) set to a value smaller than the groove width (W) and the diameter of the engaging ball 29.

The first embodiment and its modifications can be modified as follows.

It is possible to provide the through holes 31 which rotatably support the engaging balls 29, in a lower portion of the barrel portion 3*c* of the housing 3 instead of providing them in the support cylinder 13 as exemplified.

The inner peripheral surface of the sleeve 35 may be provided with a U-shaped groove or an arcuate groove instead of the exemplified V-shaped groove 36. Further, it may be a straight inner peripheral surface. With the straight inner peripheral surface, in order to inhibit the vertical movement of the sleeve 35 with respect to the engaging balls 29, it is considered to provide a snap ring or the like stopper between the inner wall 13*a* of the support cylinder 13 and the sleeve 35.

The helically formed rotary groove 27 is inclined at the angle (A) preferably within a range of 10 degrees to 30 degrees and more preferably within a range of 11 degrees to 20 degrees.

Figure 9:
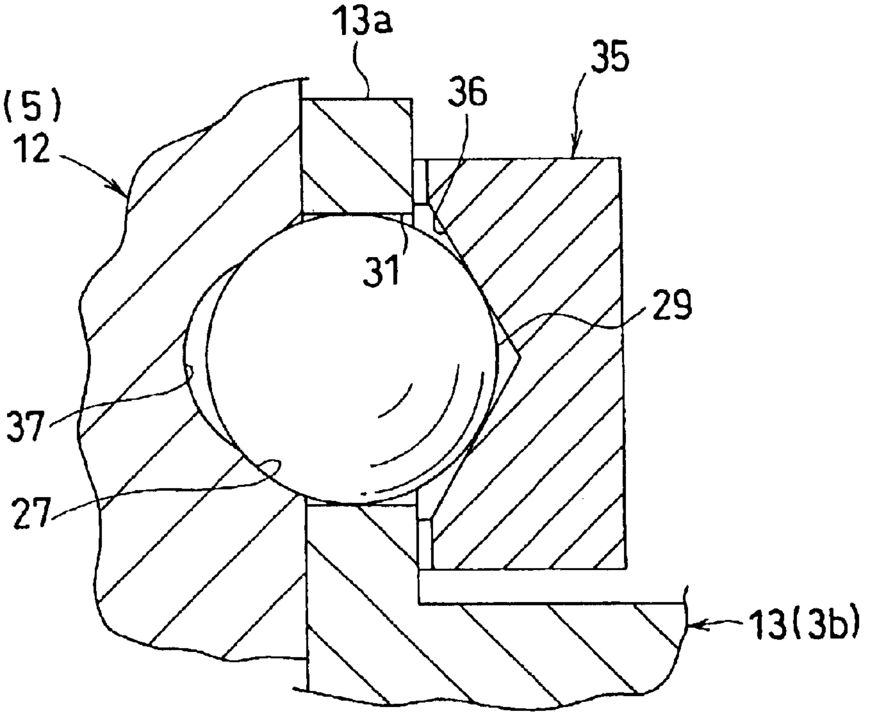
Figure 10:
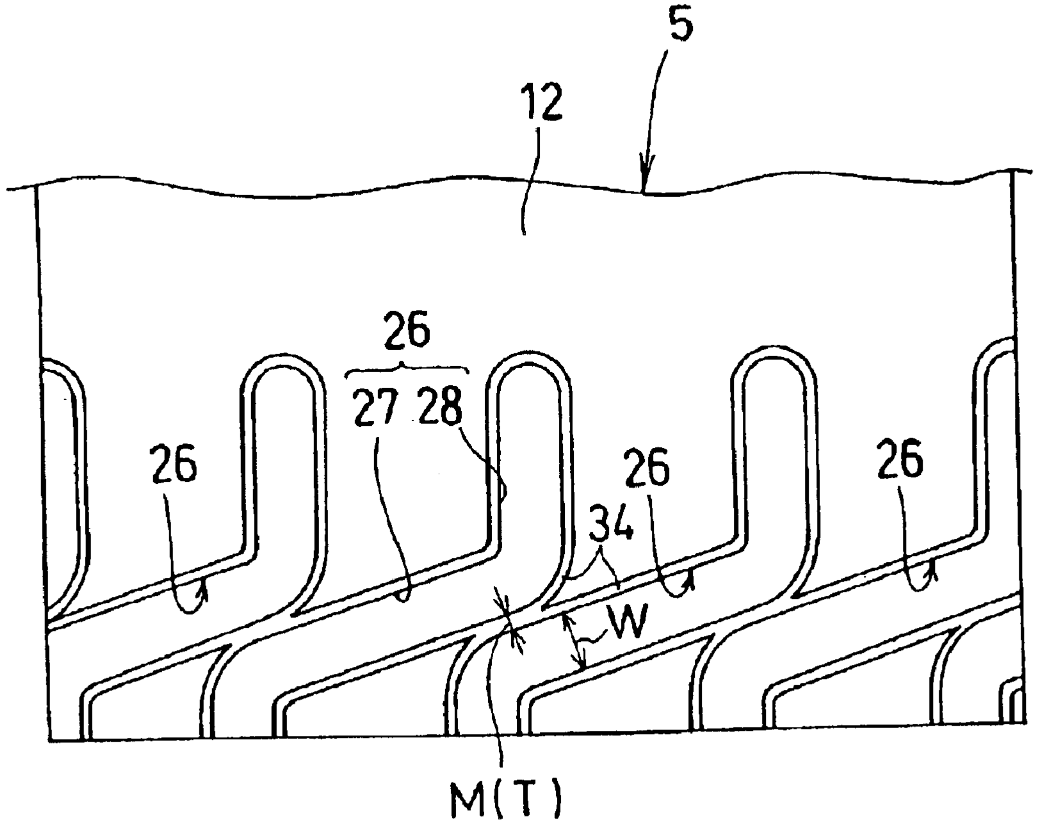
Figure 11:
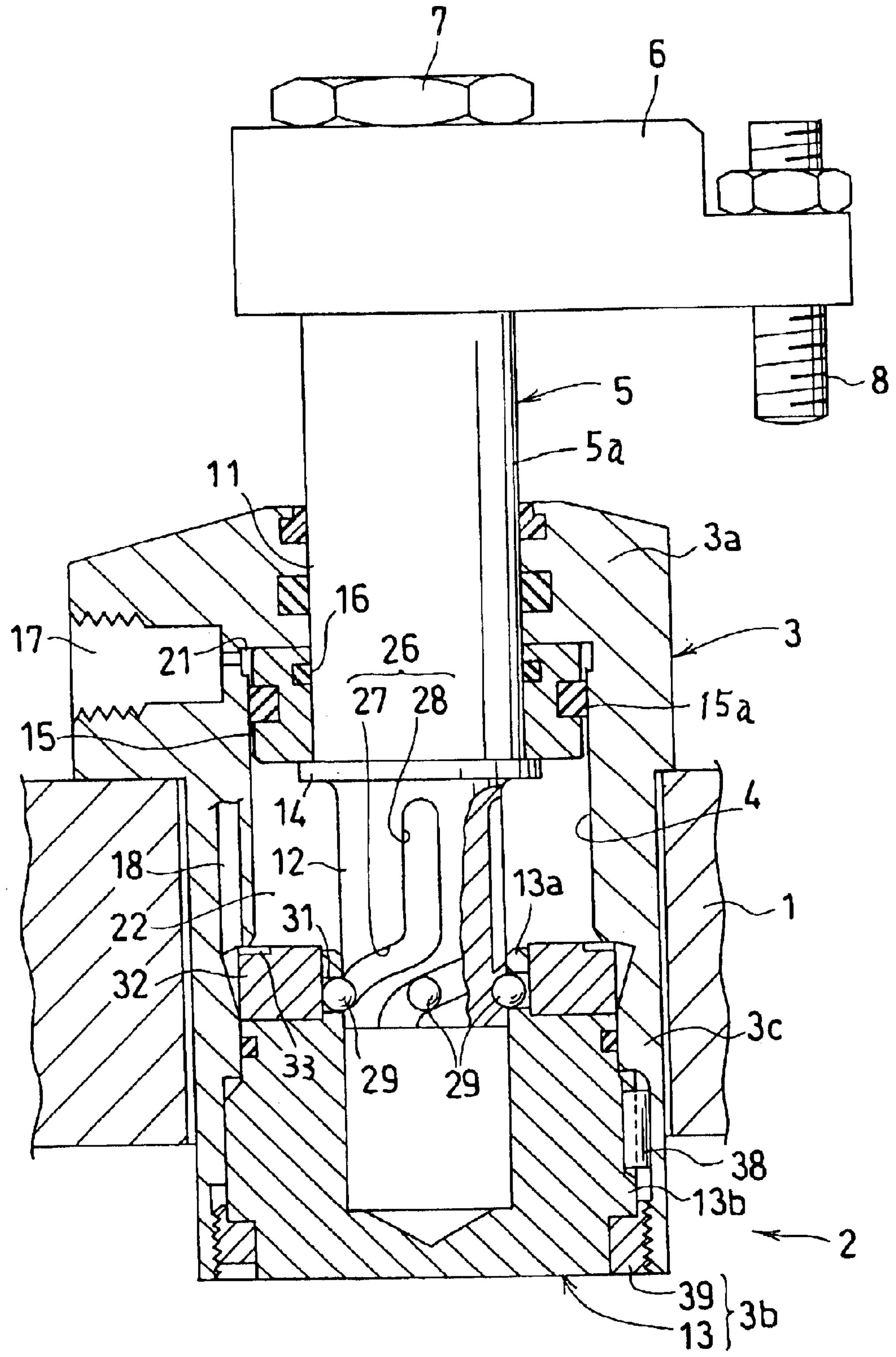
FIG. 11 shows a clamp according to a third embodiment of the present invention and is similar to FIG. 7.
Figure 12:
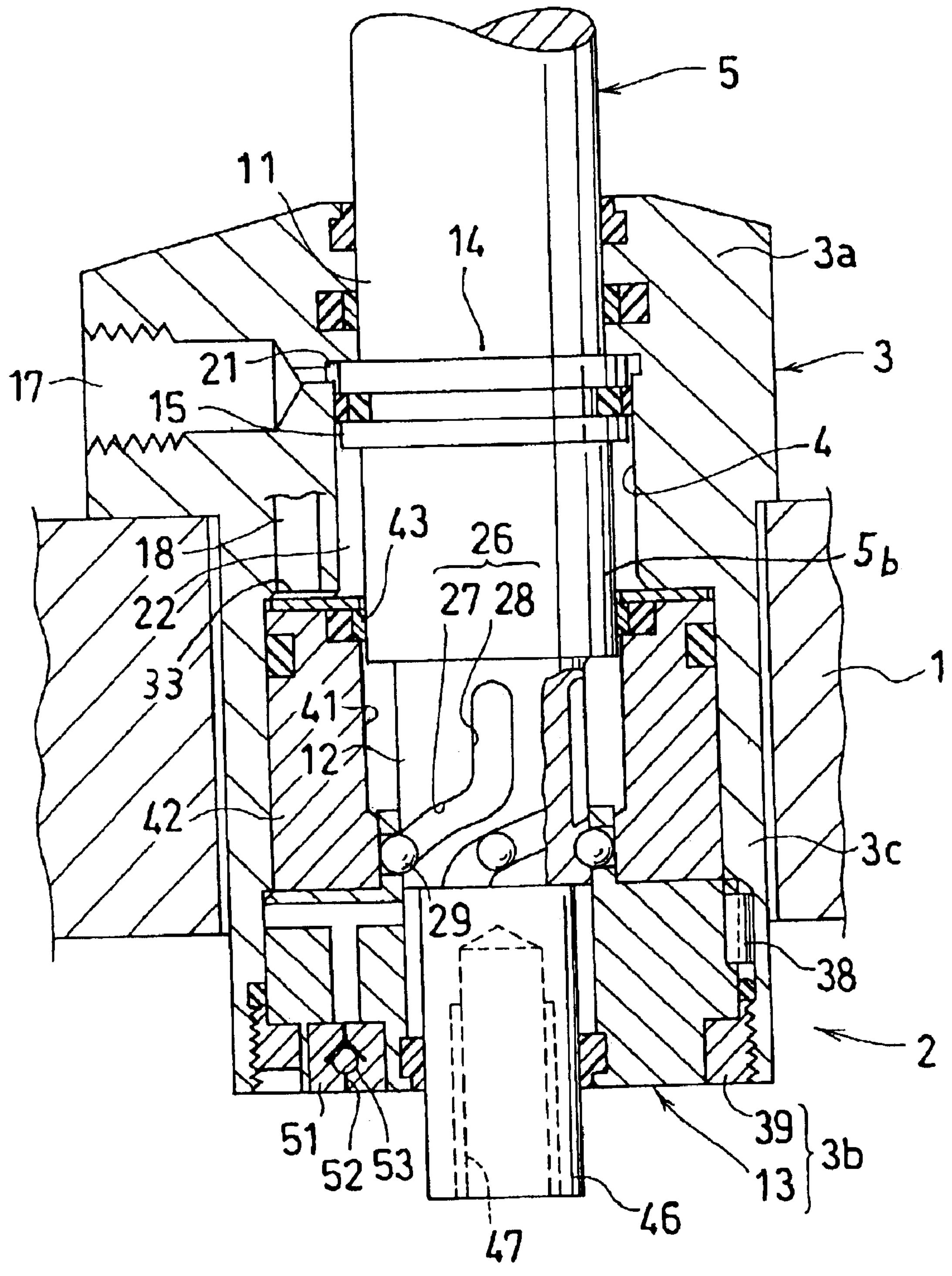
FIG. 12 shows a first modification of the third embodiment and is similar to FIG. 11.
Figure 13:
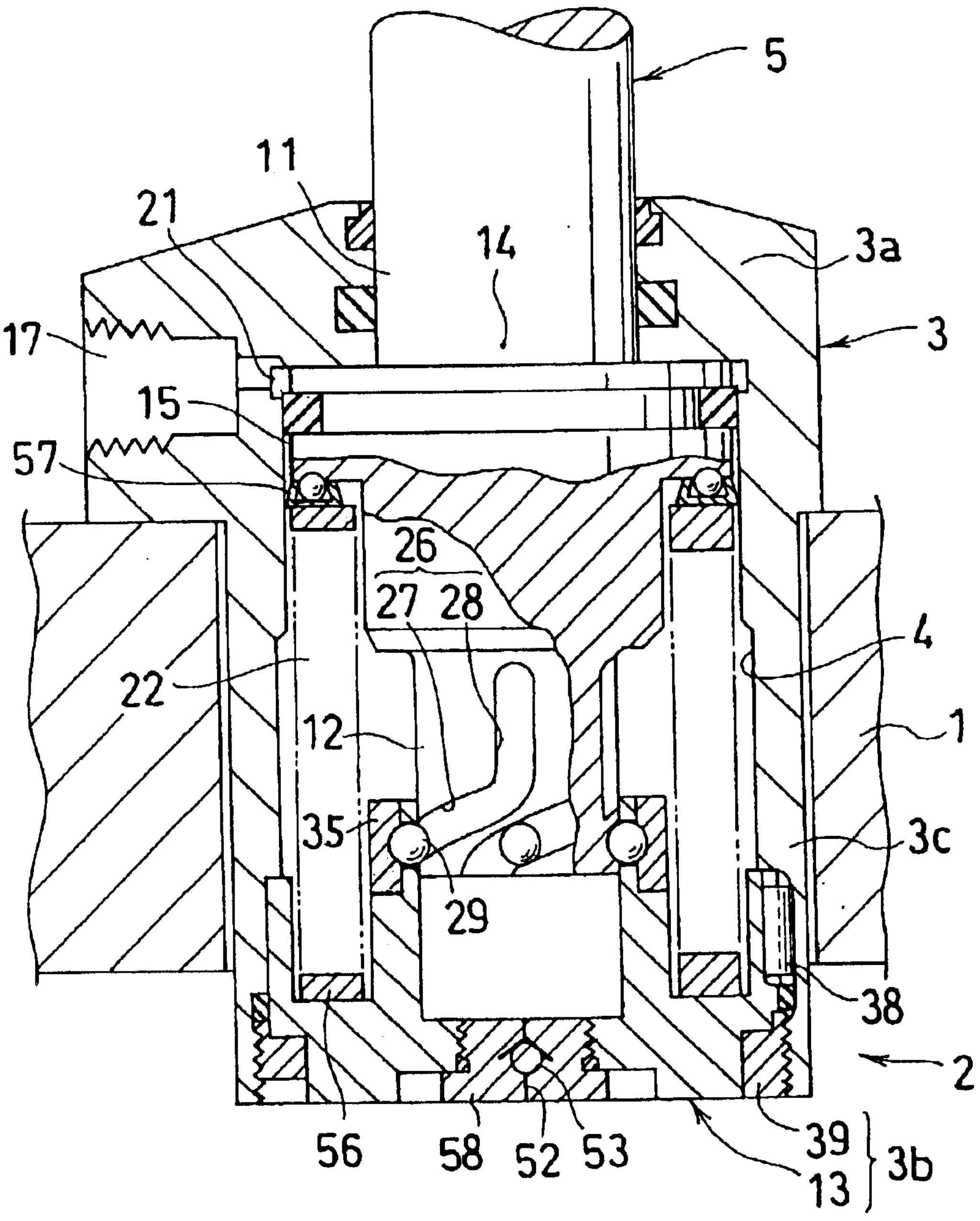
FIG. 13 shows a second modification of the third embodiment and is similar to FIG. 11.

FIGS. 7 to 10 show a second embodiment and FIGS. 11 to 13 illustrate a third embodiment. In these separate embodiments, the members similar to the constituent members in the first embodiment are, in principle, designated by the same characters.

Figure 7:
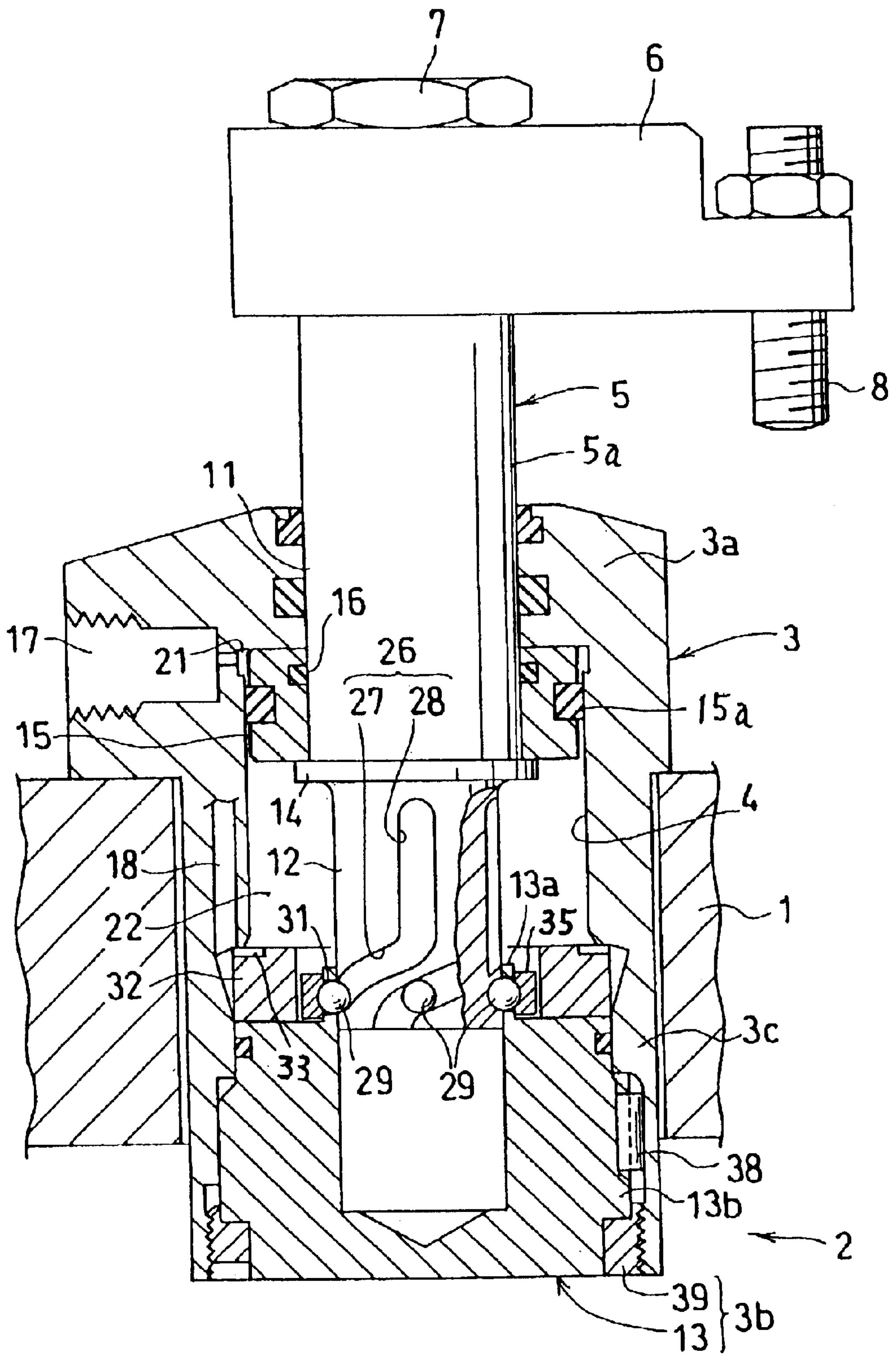
FIGS. 7 to 10 show a second embodiment of the present invention.
Figure 8:
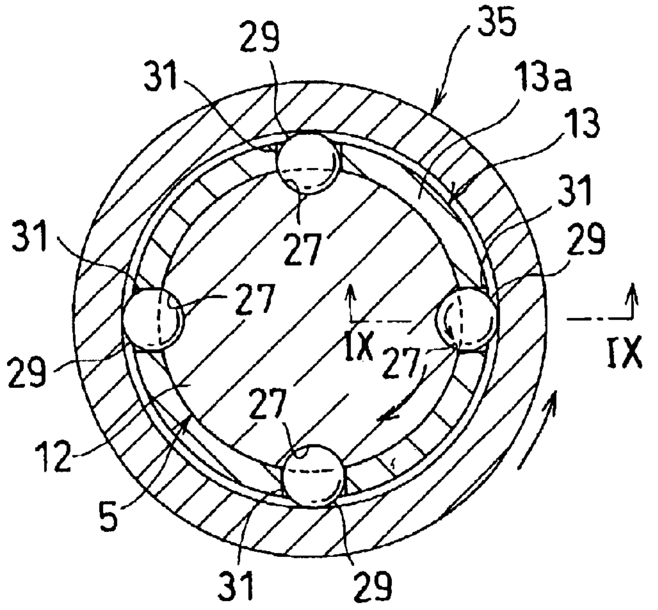

In the second embodiment shown in FIGS. 7 to 10, FIG. 7 is a partial sectional view of the rotary clamp 2 when seen in elevation and is similar to FIG. 1. FIG. 8 is a sectional view of the rotary mechanism provided in the clamp 2 when seen in plan and is similar to FIG. 2. FIG. 9 is an enlarged view of an essential portion in FIG. 7 and corresponds to a sectional view when seen along a line IX—IX in FIG. 8 in a direction indicated by arrows. FIG. 10 is an enlarged and developed view of the lower slide portion 12 provided in the clamp rod 5 of the clamp 2.

The second embodiment is different from the first embodiment on the following points.

The driving means for the clamp rod 5 is formed into a double-acting system. More specifically, pressurized oil for clamping is supplied to and discharged from the first chamber 21 provided upwards of the piston 15, through a pressurized oil supply and discharge port 17 for clamping. Further, pressurized oil for unclamping is supplied to and discharged from the second chamber 22 provided downwards of the piston 15, through a pressurized oil supply and discharge port for unclamping (not shown) and the oil passage 18.

Outside upper and lower opposite sides of another sealing member 15*a* attached to an outer periphery of the piston 15 in fitting relationship, there are formed relatively large fitting gaps between the outer peripheral surface of the piston 15 and the cylindrical hole 4. This enables the housing 3 to smoothly support the clamp rod 5 with a good accuracy at vertical two portions of the upper slide portion 11 and the lower slide portion 12.

The lower slide portion 12 has the outer peripheral surface provided with four guide grooves 26 peripherally at substantially the same spacing. Likewise the first embodiment, each of the guide grooves 26 comprises the helical rotary groove 27 and the straight groove 28 which is in upward continuity with the rotary groove 27. However, the rotary groove 27 has a lower portion opened to an under surface of the clamp rod 5 through a vertically extending groove (designated by no numeral). The engaging ball 29 can be inserted into the guide groove 26 through the opening.

Likewise the first embodiment, as for the adjacent guide grooves 26, 26, the partition wall is minimum in thickness between a lower portion of a right rotary groove 27 and an upper portion of a left rotary groove 27 in FIG. 10. The partition wall has the minimum thickness (M) set to a value smaller than the groove width (W) of the guide groove 26 and the diameter of the engaging ball 29.

The engaging balls 29 fitted into the respective guide grooves 26 are rotatably supported by the four through holes 31 provided in the upper portion of the inner wall 13*a* of the support cylinder 13. The sleeve 35 is externally fitted over these four engaging balls 29 rotatably around the axis. The rotary groove 27 is concaved to provide an arcuate recess 37. Every engaging ball 29 is rollable in the rotary groove 27 at two vertical outside positions of the recess 37.

A cylindrical spacer 32 is attached between a lower portion of a peripheral wall of the second chamber 22 for unclamping and an upper surface of the support cylinder 13. The spacer 32 has an upper surface formed with a restricting groove 33. The restricting groove 33 controls supply amount of the pressurized oil from the oil passage 18 to the second chamber 22. A though hole or the like is employable instead of the groove 33.

The support cylinder 13 is pushed and fixed to the housing barrel portion 3*c* by the lock member 39 made of an externally threaded cylinder.

Likewise the first embodiment, the lower slide portion 12 has the outer diameter set to a value smaller than that of the outer diameter of the upper slide portion 11. This shortens the lead of the helical rotary groove 27 to result in reducing the rotation stroke of the clamp rod 5.

FIG. 11 shows a third embodiment of the present invention. FIG. 11 is a partial sectional view of the rotary clamp when seen in elevation and is similar to FIG. 7.

The third embodiment of FIG. 11 is distinct from the structure shown in FIG. 7 merely on the following point.

The sleeve 35 in FIG. 7 is omitted. And the spacer 32 prevents the removal of the engaging balls 29 supported by the inner wall 13*a* of the support cylinder 13.

FIG. 12 shows a first modification of the third embodiment and is similar to FIG. 11.

The first modification of FIG. 12 differs from the structure of FIG. 11 on the following points.

The piston 15 is integrally formed with the clamp rod 5. Downwardly provided between the piston 15 and the lower end wall 3*b* are the second chamber 22 and a cylinder hole 41 for rejecting receipt of pressure in the mentioned order. The cylinder hole 41 is defined by an inner peripheral surface of an adaptor cylinder 42. The clamp rod 5 has an enclosed portion 5*b* inserted into the cylinder hole 41 hermetically by a sealing member 43.

Owing to the above arrangement, an upward force which acts on the clamp rod 5 upon unclamping is only an oil pressure force acting on an annular sectional area which appears by deducting a cross sectional area of the enclosed portion 5*b* from a cross sectional area of the second chamber 22. Therefore, any excessive force does not act on the rotary grooves 27 and the engaging balls 29.

It is sufficient if the enclosed portion 5*b* has a diameter set to a value smaller than that of a diameter of the second chamber 22. Here it is set to substantially the same value as that of the diameter of the upper slide portion 11 of the clamp rod 5.

It is preferable to set the diameter of the enclosed portion 5*b* to a value larger than that of the diameter of the upper slide portion 11. In this case, the upward force which acts on the clamp rod 5 upon unclamping can be further decreased to result in extending the service lifetime of the rotary groove 27 and the engaging ball 29.

Likewise FIG. 11, a relatively large fitting gap is formed between the outer peripheral surface of the piston 15 and an upper half portion of the cylindrical hole 4 as well as between the enclosed portion 5*b* of the clamp rod 5 and the cylinder hole 41.

The oil passage 18 has a lower end surface formed with the restricting groove 33.

A rod 46 which detects the clamping condition and the unclamping condition projects downwards from the lower slide portion 12. The rod 46 is formed with an internally threaded hole 47 which engages with a detected member (not shown) in screw-thread fitting. A limit switch or the like sensor (not shown) opposes to the detected member.

Besides, the support cylinder 13 has the lower portion into which a plug 51 is hermetically fitted. A breathing passage 52 provided within the plug 51 communicates an interior space of the cylinder hole 41 with an exterior area. The breathing passage 52, as shown in a schematic view, is provided with a trap valve 53 which comprises a check valve of spring type.

The trap valve 53 functions as follows.

When the clamp rod 5 has ascended to expand the interior space of the cylinder hole 41, checking function of the trap valve 53 prevents the cutting lubricant and the like present in the exterior atmosphere from invading into the cylinder hole 41. Further, when the clamp rod 5 has descended to contract the interior space of the cylinder hole 41, the trap valve 53 smoothly discharges to the exterior area the pressurized oil which has invaded from the second chamber 22 to the interior space of the cylinder hole 41.

FIG. 13 shows a second modification of the third embodiment and is similar to FIG. 11. FIG. 13 shows the rotary clamp 2 of single-acting and spring-return type, which is different from the structure shown in FIG. 11 on the following points.

The piston 15 is formed integrally with the clamp rod 5. A return spring 56 for unclamping is attached within the second chamber 22 formed between the support cylinder 13 and the piston 15. The return spring 56 urges the clamp rod 5 upwards. Here the return spring 56 is composed of a compressed coil spring. The spring 56 has a lower end brought into contact with the support cylinder 13 and has an upper end received by the piston 15 through a thrust ball bearing 57.

In addition, the sleeve 35 is rotatably and externally fitted over the engaging balls 29.

The trap valve 53 is attached to a bolt 58 which engages with a mid portion of the support cylinder 13 in screw-thread fitting.

The respective embodiments and modifications can be further modified as follows.

The clamp rod 5 is preferably provided with three or four guide grooves 26, but it may be provided with one or two guide grooves. Further, at least five guide grooves may be provided. And the guide groove 26 may have a groove in the shape of a cam instead of the exemplified helical rotary groove 27.

It is sufficient if the minimum thickness (T) of the partition wall between the adjacent guide grooves 26, 26 has a value smaller than the diameter of the engaging ball 29. In consequence, the minimum thickness (T) can be made to have a value larger than the groove width (W) of the guide groove 26.

Besides, the engaging member which is fitted into the guide groove 26 may be a columnar pin or the like instead of the exemplified ball 29.

In addition, each of the rotary portion 27 and the straight portion 28 which constitute the rotary mechanism may be formed in a convex shape instead of the exemplified groove. In this case, it is sufficient if the engaging member 29 is formed in a concave shape.

The pressurized fluid which is supplied to and discharged from the first chamber 21 or the second chamber 22 may be other kinds of liquid, and air or the like gas, instead of the exemplified pressurized oil.

On performing clamping operation, the clamp rod 5 rotates in the clockwise direction when seen in plan. Instead, on performing the clamping operation, it may rotate in the counter-clockwise direction when seen in plan. Further, it is a matter of course that the rotation angle of the clamp rod 5 may be set to a desired angle, for example, such as 90 degrees, 60 degrees and 45 degrees.

What is claimed is:

1. A rotary clamp movable between an unclamped position and a position comprising:

a housing (3) having a first end wall (3*a*) and a second end wall (3*b*);

a clamp rod (5) having a first slide portion (11), a second slide portion (12) and an input portion (14), the first slide portion (11) and the second slide portion (12) being supported by and axially movable with respect to the first end wall (3*a*) and the second end wall (3*b*), the input portion (14) being provided between the first slide portion (11) and the second slide portion (12), wherein the clamp rod (5) is moved toward the second end wall (3*b*) when changing the clamp from the unclamped position to the clamped position;

at least one guide groove (26) having a rotary portion (27) and a straight portion (28), the at least one guide groove (26) being provided in an outer periphery of the second slide portion (12) so that the at least one guide groove (26) extends continuously from the rotary portion (27) to the straight portion (28); and an engaging member (29) provided in the second end wall (3*b*) so as to engage with the rotary portion (27) and the straight portion (28).

2. The rotary clamp as set forth in claim 1, wherein the second slide portion (12) has an outer diameter set to a value smaller than that of an outer diameter of the first slide portion (11).

3. The rotary clamp as set forth in claim 1, wherein the clamp rod (5) is mounted on an annular piston (15) so that the piston (15) moves axially with the clamp rod (5), the piston (15) being positioned on a first side of the input portion (14), there being provided between the piston (15) and the first end wall (3*a*) a first chamber (21) in which a clamp spring (20) is attached, there being provided between the piston (15) and the second end wall (3*b*) a second chamber (22) to which pressurized fluid for unclamping is supplied.

4. The rotary clamp as set forth in claim 1, wherein an annular piston (15) is externally fitted onto the clamp rod (5) axially movably and hermetically, the piston (15) facing the input portion (14) from a side of the first end wall (3*a*), there being provided between the piston (15) and the first end wall (3*a*) a first chamber (21) to which pressurized fluid for clamping is supplied, there being provided between the piston (15) and the second end wall (3*b*) a second chamber (22) to which pressurized fluid for unclamping is supplied.

5. The rotary clamp as set forth in claim 3, wherein a radial bearing (24) is arranged between the piston (15) and the input portion (14).

6. The rotary clamp as set forth in claim 1, wherein the engaging member (29) is formed from a ball.

7. The rotary clamp as set forth in claim 6, wherein the housing (3) has a plurality of through holes (31), and the clamp rod (5) is peripherally provided with the rotary portion (27) and the straight portion (28), each of which is defined by the groove, in plural number, the respective engaging balls (29) which engage with the rotary portions (27) and the straight portions (28) being rotatably supported by the through holes (31), a sleeve (35) being rotatably and externally fitted over the engaging balls (29).

8. The rotary clamp as set forth in claim 2, wherein the clamp rod (5) is mounted on an annular piston (15) so that the piston (15) moves axially with the clamp rod (5), the piston (15) being positioned on a first side of the input portion (14), there being provided between the piston (15) and the first end wall (3*a*) a first chamber (21) in which a clamp spring (20) is attached, there being provided between the piston (15) and the second end wall (3*b*) a second chamber (22) to which pressurized fluid for unclamping is supplied.

9. The rotary clamp as set forth in claim 2, wherein an annular piston (15) is externally fitted onto the clamp rod (5) axially movably and hermetically, the piston (15) facing the input portion (14) from a side of the first end wall (3*a*), there being provided between the piston (15) and the first end wall (3*a*) a first chamber (21) to which pressurized fluid for clamping is supplied, there being provided between the piston (15) and the second end wall (3*b*) a second chamber (22) to which pressurized fluid for unclamping is supplied.

10. The rotary clamp as set forth in claim 4, wherein a radial bearing (24) is arranged between the piston (15) and the input portion (14).

11. The rotary clamp as set forth in claim 2, wherein the engaging member (29) is formed from a ball.

12. The rotary clamp as set forth in claim 3, wherein the engaging member (29) is formed from a ball.

13. The rotary clamp as set forth in claim 4, wherein the engaging member (29) is formed from a ball.

14. The rotary clamp as set forth in claim 5, wherein the engaging member (29) is formed from a ball.

* * * * *